(12) United States Patent
Takahashi et al.

(10) Patent No.: US 10,189,229 B2
(45) Date of Patent: Jan. 29, 2019

(54) SURFACE-TREATED STEEL SHEET

(71) Applicant: NIPPON STEEL & SUMITOMO METAL CORPORATION, Tokyo (JP)

(72) Inventors: Takehiro Takahashi, Himeji (JP); Kiyokazu Ishizuka, Himeji (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 155 days.

(21) Appl. No.: 15/110,920

(22) PCT Filed: Jan. 28, 2015

(86) PCT No.: PCT/JP2015/052331
§ 371 (c)(1),
(2) Date: Jul. 11, 2016

(87) PCT Pub. No.: WO2015/115469
PCT Pub. Date: Aug. 6, 2015

(65) Prior Publication Data
US 2016/0368243 A1    Dec. 22, 2016

(30) Foreign Application Priority Data
Jan. 28, 2014  (JP) ................................ 2014-013525

(51) Int. Cl.
*B32B 15/00*   (2006.01)
*B32B 15/01*   (2006.01)
(Continued)

(52) U.S. Cl.
CPC ............ *B32B 15/013* (2013.01); *B32B 15/01* (2013.01); *B32B 15/18* (2013.01); *C22C 18/00* (2013.01);
(Continued)

(58) Field of Classification Search
None
See application file for complete search history.

(56) References Cited

U.S. PATENT DOCUMENTS 5,618,634 A * 4/1997 Hosoda ............... C23C 28/3225
205/104
2004/0048093 A1  3/2004 Sugiyama et al.
(Continued)

FOREIGN PATENT DOCUMENTS

JP          63-93888 A      4/1988
JP          63-118078 A     5/1988
(Continued)

OTHER PUBLICATIONS

Chromate-free electro galvanized steel sheets KOBEZINK Characteristic comparison of GREENCOAT GK Series Kobe Steel, Ltd., Jul. 2005, pp. 1-12.
(Continued)

*Primary Examiner* — Seth Dumbris
(74) *Attorney, Agent, or Firm* — Birch, Stewart, Kolasch & Birch, LLP

(57) ABSTRACT

A surface-treated steel sheet of the present invention includes: a base steel sheet; a surface treatment layer which is formed on at least one surface of the base steel sheet and includes an oxide layer and a metal layer; and a chemical conversion layer which is formed on a surface of the surface treatment layer. The surface treatment layer contains Zn in an adhered amount of 0.30 g/m$^2$ to 2.00 g/m$^2$ and Ni in an adhered amount of 0.03 g/m$^2$ to 2.00 g/m$^2$, which is equal to or lower than the adhered amount of Zn. In a case of performing a glow discharge spectrometry, at an interface between the oxide layer and the metal layer, an emission intensity of Fe atoms is 20% or less of the maximum emission intensity of the Fe atoms, and the emission intensity of Ni atoms is 20% or less of the maximum emission
(Continued)

intensity of the Ni atoms. In addition, a first range in which the emission intensity of Zn atoms is 60% or higher of the maximum emission intensity of the Zn atoms and a second range in which the emission intensity of the Ni atoms is 60% or higher of the maximum emission intensity of the Ni atoms overlap.

5 Claims, 3 Drawing Sheets

(51) Int. Cl.
| | |
|---|---|
| C22C 38/00 | (2006.01) |
| C22C 38/04 | (2006.01) |
| B32B 15/18 | (2006.01) |
| C23C 28/00 | (2006.01) |
| C25D 3/12 | (2006.01) |
| C25D 3/22 | (2006.01) |
| C25D 5/12 | (2006.01) |
| C25D 5/48 | (2006.01) |
| C25D 5/50 | (2006.01) |
| C22C 18/00 | (2006.01) |
| C22C 38/02 | (2006.01) |
| C22C 38/06 | (2006.01) |
| C22C 38/12 | (2006.01) |
| C22C 38/14 | (2006.01) |
| C25D 3/30 | (2006.01) |
| C25D 3/56 | (2006.01) |
| C25D 13/10 | (2006.01) |
| C25D 3/32 | (2006.01) |

(52) U.S. Cl.
CPC .......... *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *C23C 28/321* (2013.01); *C23C 28/345* (2013.01); *C25D 3/12* (2013.01); *C25D 3/22* (2013.01); *C25D 3/30* (2013.01); *C25D 3/565* (2013.01); *C25D 5/12* (2013.01); *C25D 5/48* (2013.01); *C25D 5/50* (2013.01); *C25D 13/10* (2013.01); *B32B 2307/714* (2013.01); *B32B 2457/00* (2013.01); *C25D 3/32* (2013.01)

(56) References Cited

U.S. PATENT DOCUMENTS

| 2009/0110921 A1 | 4/2009 | Kaneto et al. |
| 2013/0209832 A1 | 8/2013 | Kim et al. |

FOREIGN PATENT DOCUMENTS

| JP | 2-26246 A | 1/1990 |
| JP | 3-291386 A | 12/1991 |
| JP | 2003-226986 A | 8/2003 |
| JP | 2004-211149 A | 7/2004 |
| JP | 2007-239063 A | 9/2007 |
| JP | 2007-247017 A | 9/2007 |
| JP | 2011-167891 A | 9/2011 |
| JP | 4776458 B2 | 9/2011 |
| JP | 2013-76148 A | 4/2013 |
| JP | 2013-540207 A | 10/2013 |

OTHER PUBLICATIONS

International Search Report for PCT/JP2015/052331 dated Apr. 21, 2015.
Panek et al., "The corrosion resistance of zinc-nickel composite coatings", Journal of Achievements in Materials and Manufacturing Engineering, Apr. 2011, vol. 45, Issue 2, pp. 157-162.
Written Opinion of the International Searching Authority for PCT/JP2015/052331 (PCT/ISA/237) dated Apr. 21, 2015.
Japanese Notice of Allowance, dated Nov. 1, 2016, for Japanese Application No. 2015-552697, together with an English translation thereof.
Japanese Office Action and English translation thereof dated Jul. 5, 2016 for Application No. 2015-552697.

\* cited by examiner

SURFACE-TREATED STEEL SHEET

TECHNICAL FIELD OF THE INVENTION

The present invention relates to a surface-treated steel sheet.

Priority is claimed on Japanese Patent Application No. 2014-13525, filed on Jan. 28, 2014, the content of which is incorporated herein by reference.

RELATED ART

A galvanized steel sheet includes a steel sheet as a base metal (hereinafter, referred to as a base steel sheet), and a Zn coated layer formed on the surface of the base steel sheet. As the adhered amount of the Zn coating increases, the corrosion resistance of the galvanized steel sheet increases.

Regarding the galvanized steel sheet, for the purpose of enhancing corrosion resistance and enhancing glossiness, in many cases, chemical conversion is performed on the surface of the Zn coated layer.

Corrosion of the galvanized steel sheet subjected to the chemical conversion occurs in the following first to fourth stages.

In the first stage, white rust which is the product of corrosion of Zn is generated.

In the second stage, Zn in the periphery of the corroded site is eluted faster than Fe in the base steel sheet to electrochemically protect the base steel sheet (sacrificial protection).

In the third stage, the white rust covers the base steel sheet such that the corrosion of the base steel sheet is limited.

In the fourth stage, the white rust disappears from the surface of the base steel sheet such that the base steel sheet is exposed. Accordingly, Fe in the base steel sheet is corroded, and red rust which is the product of corrosion of Fe is generated.

In practice, the above-described phenomena occur in parallel and corrosion proceeds. As the adhered amount of the Zn coating increases, the progress of corrosion in the second and third stages is limited.

Depending on the type and application of the galvanized steel sheet, there may be a case of placing emphasis on the prevention of the generation of white rust and a case of placing emphasis on the prevention of the generation of red rust.

In Patent Document 1 and Non-Patent Document 1, an electrogalvanized steel sheet in which the surface of a base steel sheet is coated with Zn by an electro coating method is disclosed.

In many cases, an electrogalvanized steel sheet places emphasis on the prevention of the generation of white rust as described in Patent Document 1 and Non-Patent Document 1.

In Patent Document 2 described below, a surface-treated steel sheet for an electronic device component is disclosed. In the surface-treated steel sheet for an electronic device component of Patent Document 2, one surface of a base steel sheet is coated with Ni and Zn, and the other surface thereof is coated with Ni, Sn, and Zn. In the surface-treated steel sheet for an electronic device component of Patent Document 2, after the base steel sheet is coated with the metals, an alloying process is performed thereon through heating to enhance corrosion resistance.

PRIOR ART DOCUMENT

Patent Document

[Patent Document 1] Japanese Unexamined Patent Application, First Publication No. 2011-167891

[Patent Document 2] Japanese Unexamined Patent Application, First Publication No. H3-291386

Non-Patent Document

[Non-Patent Document 1] catalogue for chromate-free electrogalvanized steel sheets on comparison in characteristics between Kobe zinc GREENCOAT GX series by Kobe Steel, Ltd. on July 2005

DISCLOSURE OF THE INVENTION

Problems to be Solved by the Invention

In principle, the generation of white rust in the galvanized steel sheet in which the surface of the Zn coated layer is subjected to the chemical conversion is determined by the interaction between Zn and chemical substances subjected to the chemical conversion. Therefore, regarding the galvanized steel sheet subjected to the chemical conversion, it is thought that there is no connection between the generation of white rust and the adhered amount of the Zn coating.

However, in practice, in a case where the adhered amount of the Zn coating is low, white rust is generated faster than in a case where the adhered amount of the Zn coating is high.

In a case where the adhered amount of the Zn coating is $2$ $g/m^2$ or less, Zn is precipitated onto the base steel sheet in a granular form, and the surface of the base steel sheet may have portions which are not covered with Zn. In the portions of the surface of the base steel sheet which are not covered with Zn, the base steel sheet and the chemical conversion layer come into close contact with each other. Therefore, corrosion proceeds due to the interaction between the base steel sheet and the chemical conversion layer such that the chemical conversion layer is broken. Accordingly, the Zn coated layer is not covered with the chemical conversion layer such that white rust is formed.

In a case where the adhered amount of the Zn coating is higher than $2$ $g/m^2$, such problems do not necessarily occur. However, from the viewpoint of an increase in costs, the degradation of productivity caused by the performance of a plating rectifier, and the conservation of resources, it is not preferable to increase the adhered amount of the Zn coating.

In the electrogalvanized steel sheet described in Patent Document 1 and Non-Patent Document 1, only the Zn coated layer is formed on the base steel sheet. Therefore, in order to obtain sufficient corrosion resistance, there is a need to increase the adhered amount of the Zn coating.

In the surface-treated steel sheet for an electronic device component described in Patent Document 2, an alloying process of Ni and Zn is insufficiently performed, and there may be cases where preferable corrosion resistance is not obtained.

Means for Solving the Problem

The present invention has been made taking the foregoing circumstances into consideration, and an object thereof is to provide a surface-treated steel sheet which is excellent in corrosion resistance, economic efficiency, productivity, and environmental properties.

The present invention employs the following aspects in order to solve the problems and accomplish the related object.

(1) According to an aspect of the present invention, a surface-treated steel sheet includes: a base steel sheet; a surface treatment layer which is formed on at least one surface of the base steel sheet and includes an oxide layer and a metal layer; and a chemical conversion layer which is formed on a surface of the surface treatment layer. The surface treatment layer contains Zn in an adhered amount of 0.30 g/m$^2$ to 2.00 g/m$^2$ and Ni in an adhered amount of 0.03 g/m$^2$ to 2.00 g/m$^2$, which is equal to or lower than the adhered amount of Zn. In a case where distribution curves of emission intensities of Fe atoms, Zn atoms, and Ni atoms are obtained respectively by performing a glow discharge spectrometry in a range from a surface of the chemical conversion layer, which is used as a measurement start position, to a position at 1 μm from the surface of the surface treatment layer in a depth direction, which is used as a measurement end position, the emission intensity of the Fe atoms at an interface between the oxide layer and the metal layer is 20% or less of the maximum emission intensity of the Fe atoms. The emission intensity of the Ni atoms at the interface is 20% or less of the maximum emission intensity of the Ni atoms. In addition, a first range in which the emission intensity of the Zn atoms is 60% or higher of the maximum emission intensity of the Zn atoms in the depth direction and a second range in which the emission intensity of the Ni atoms is 60% or higher of the maximum emission intensity of the Ni atoms overlap.

(2) In the surface-treated steel sheet according (1), in a case where measurement data which represents a correspondence relationship between a diffracted X-ray intensity and a diffraction angle 2θ is obtained by performing an X-ray diffraction analysis on the surface treatment layer, a peak of the diffracted X-ray intensity may be present in at least one of a range of the diffraction angles 2θ between 39.6° and 40.3° and a range of the diffraction angles 2θ between 78.7° and 79.2°.

(3) In the surface-treated steel sheet according to (1), the adhered amount of Zn in the surface treatment layer may be 0.80 g/m$^2$ to 1.20 g/m$^2$, and the adhered amount of Ni in the surface treatment layer may be equal to or higher than 0.07 g/m$^2$ and may be equal to or lower than half of the adhered amount of Zn.

(4) In the surface-treated steel sheet according to (1), the surface treatment layer may further contain Sn in an adhered amount of 10% or lower of the adhered amount of Zn.

(5) In the surface-treated steel sheet according to (1), the average thickness of the surface treatment layer may be 0.30 μm or smaller.

Effects of the Invention

According to the aspects, a surface-treated steel sheet which is excellent in corrosion resistance, economic efficiency, productivity, and environmental properties can be provided.

EMBODIMENTS OF THE INVENTION

Hereinafter, the configuration of a surface-treated steel sheet in an embodiment and a manufacturing method thereof will be described. The surface-treated steel sheet of the embodiment can be used in an application in which the prevention of white rust is required. For example, the surface-treated steel sheet can be used in the back plate of a home appliance, the component of a home appliance, a bearing cover, or the like.

Figure 1:
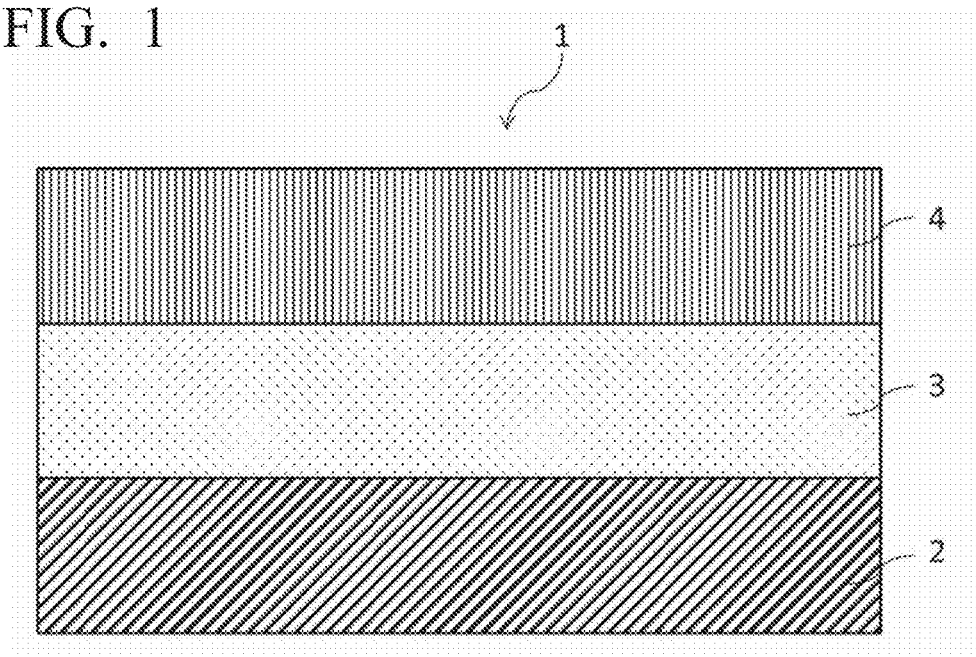
FIG. 1 a view of the configuration of a surface-treated steel sheet of the present invention.

As shown in FIG. 1, a surface-treated steel sheet 1 of this embodiment includes a base steel sheet 2, a surface treatment layer 3 formed on at least one surface of the base steel sheet 2, and a chemical conversion layer 4 formed on the surface of the surface treatment layer 3.

The surface treatment layer 3 is a coated layer containing Zn and Ni. The adhered amount of Zn in the surface treatment layer 3 is 0.30 g/m$^2$ to 2.00 g/m$^2$, and the adhered amount of Ni is 0.03 g/m$^2$ to 2.00 g/m$^2$.

In addition, in the surface-treated steel sheet 1 of this embodiment, the adhered amount of Ni is equal to or less than the adhered amount of Zn.

The surface treatment layer 3 includes an oxide layer on the surface side and has a metal layer on the base steel sheet 2 side. In an alloying process, which described later, Zn and Ni are alloyed with each other, such that a Zn—Ni alloy layer is formed in the metal layer of the surface treatment layer 3.

In addition, in the surface treatment layer 3, the concentration of Zn changes depending on the depth from the surface of the surface treatment layer 3. The concentration of Zn is maximized in the metal layer of the surface treatment layer 3.

In a case where the adhered amount of the Zn coating is 3 g/m$^2$, the corrosion resistance of the base steel sheet significantly varies. Therefore, even in the case where the adhered amount of the Zn coating is 3 g/m$^2$, the effect of this embodiment can be confirmed. However, the effect of this embodiment is significantly exhibited when the adhered amount of the Zn coating is 2 g/m$^2$ or less.

Particularly, in a case where the adhered amount of the Zn coating is 1.2 g/m$^2$ or less, more excellent corrosion resistance can be obtained compared to a case where the surface of the base steel sheet 2 is coated only with Zn.

In a case where the adhered amount of the Zn coating is less than 0.30 g/m$^2$, it is difficult to uniformly coat the base steel sheet 2 with the surface treatment layer 3 and therefore it is difficult to obtain preferable corrosion resistance.

From the viewpoint of more stably obtaining corrosion resistance, the adhered amount of the Zn coating is preferably 0.5 g/m² or more, and is more preferably 0.8 g/m² or more.

Ni contained in the surface treatment layer 3 has an effect of limiting the corrosion of the surface treatment layer 3. Therefore, by allowing the surface treatment layer 3 to contain Ni, the corrosion resistance of the surface-treated steel sheet 1 is further enhanced compared to a case where the surface treatment layer 3 contains only Zn and a case where the surface treatment layer 3 contains only an Fe—Zn alloy.

However, in a case where the adhered amount of the Ni coating is too high, the ionization tendency of the surface treatment layer 3 becomes lower than that of Fe, and the sacrificial protection effect of Zn is lost.

On the other hand, in a case where the adhered amount of the Ni coating is too low, the corrosion limitation effect of the surface treatment layer 3 is degraded, and Fe in the base steel sheet 2 is excessively diffused.

For the above reasons, the adhered amount of the Ni coating is 0.03 g/m² to 2.00 g/m².

From the viewpoint of more stably obtaining corrosion resistance, the adhered amount of the Ni coating is preferably 0.05 g/m² or more, and is more preferably 0.07 g/m² or more.

In addition, as described later, Zn and Ni contained in the surface treatment layer 3 are alloyed with each other by a heating process. During the heating process, in a case where the adhered amount of the Ni coating of the surface treatment layer 3 is high, there is a possibility that Ni may not be alloyed with Zn. Even in a case where Zn and Ni are alloyed with each other, the proportion of Ni in the surface treatment layer 3 increases. In such a case, the ionization tendency of the surface treatment layer 3 becomes lower than the ionization tendency of the base steel sheet 2, and thus the sacrificial protection effect of Zn is not obtained. Therefore, the base steel sheet 2 may be corroded and the corrosion resistance is degraded.

For the above reasons, the adhered amount of the Ni coating in the surface treatment layer 3 is equal to or less than the adhered amount of the Zn coating.

Particularly stable corrosion resistance is obtained in a case where the adhered amount of the Ni coating is equal to or less than half of the adhered amount of the Zn coating.

However, in a case where Ni is present as a single element, Ni may accelerate the corrosion of the surface treatment layer 3. Therefore, Ni needs to be contained as an alloy in the surface treatment layer 3.

The surface treatment layer 3 may contain Sn in addition to Ni and Zn. Sn has an effect of limiting the corrosion of the surface treatment layer 3.

However, when Sn is present as a single element, Sn may accelerate corrosion. In addition, in a case where Sn is contained in the surface treatment layer 3 as an alloy with Zn, the crystals of the Zn—Sn alloy are less likely to be grown than the crystals of Zn. Therefore, the coatability of the base steel sheet 2 is enhanced. In addition, the Zn—Sn alloy has a lower melting point than that of Zn and is easily alloyed with Ni.

For the above reasons, Sn needs to be contained as an alloy with other metals in the surface treatment layer 3.

In a case where the adhered amount of the Sn coating contained in the surface treatment layer 3 is high, the ionization tendency of the surface treatment layer 3 becomes lower than that of Fe, and the sacrificial protection effect of Zn is lost. Therefore, in a case where Sn is contained in the surface treatment layer 3, the adhered amount of the Sn coating is 10% or less of the adhered amount of the Zn coating.

The adhered amount of the Sn coating is more preferably 0.05 g/m² or less. The adhered amount of the Sn coating is even more preferably 0.04 g/m² or less. The adhered amount of the Sn coating is even more preferably 0.03 g/m² or less.

In the surface-treated steel sheet 1 of this embodiment, in a case where the Zn—Ni alloy layer is insufficiently formed, the base steel sheet 2 cannot be sufficiently coated with the surface treatment layer 3. Therefore, sufficient corrosion resistance cannot be obtained.

On the other hand, in a case where alloying is excessively performed, the concentration of Fe and Ni in the vicinity of the surface of the surface treatment layer 3 increases. In this case, the sacrificial protection effect of Zn is not obtained, and thus sufficient corrosion resistance is not obtained.

The chemical conversion layer 4 is not particularly limited, and a well-known chemical conversion layer 4 for Zn coating may be used.

For example, in order to enhance the coatability of the base steel sheet 2 and the surface treatment layer 3 by the chemical conversion layer 4, the chemical conversion layer 4 may contain a resin such as polyester, polyurethane, epoxy, phenol, or a modified polyolefin. In order to enhance the rust-proofing properties of the surface-treated steel sheet 1, the chemical conversion layer 4 may contain silica, silane oligomer, organic titanate, a tannic acid salt, phosphate, a vanadyl compound, a guanidyl compound, or the like.

In order to color the chemical conversion layer 4, the chemical conversion layer 4 may contain a pigment or a dye.

In order to enhance the slidability of the surface-treated steel sheet 1, the chemical conversion layer 4 may contain wax or the like.

The alloyed state of Zn and Ni in the surface treatment layer 3 may be checked by glow discharge spectrometry (GDS). Specifically, measurement is started from the surface of the chemical conversion layer 4 toward the inside of the base steel sheet 2 through GDS, and a region to a depth position of 1 μm from the surface of the surface treatment layer 3 (the interface between the surface treatment layer 3 and the chemical conversion layer 4) is analyzed.

The interface between the surface treatment layer 3 and the chemical conversion layer 4 and the interface between the oxide layer of the surface treatment layer 3 and the metal layer of the surface treatment layer 3 are each determined on the basis of the measurement results of GDS as follows.

<Interface Between Surface Treatment Layer 3 and Chemical Conversion Layer 4>

Figure 2:
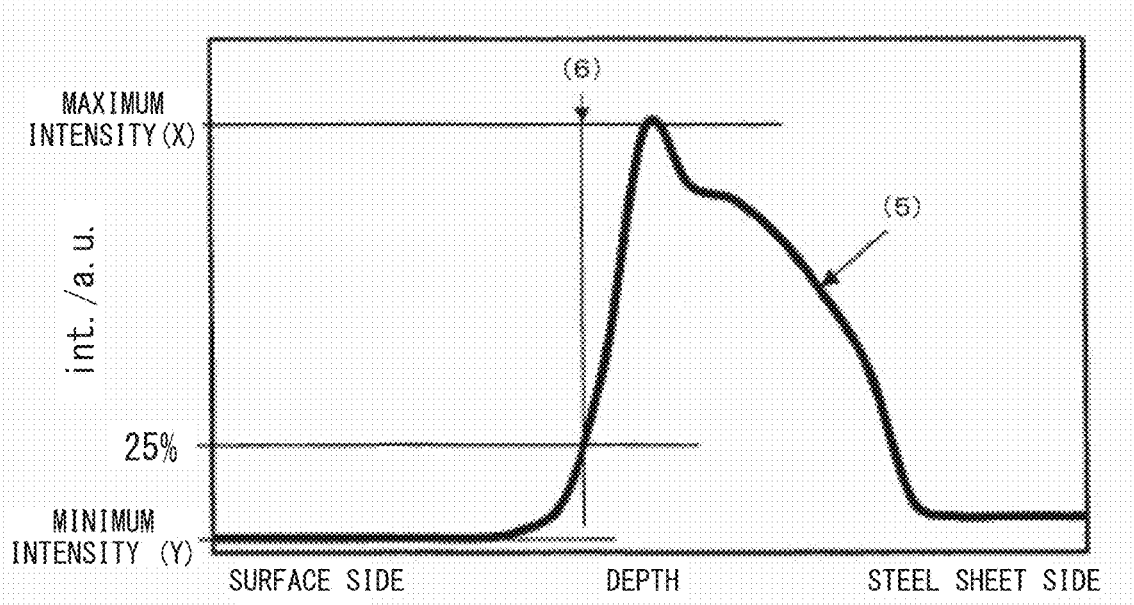
FIG. 2 is a schematic view showing a measurement result of the emission intensity of Zn atoms when the surface-treated steel sheet of the present invention is analyzed from the surface thereof through GDS.

FIG. 2 shows a measurement result 5 of the emission intensity of Zn atoms by GDS. The horizontal axis of FIG. 2 represents the measurement depth (depth) from the surface of the chemical conversion layer 4. The vertical axis of FIG. 2 represents the emission intensity of the Zn atoms ejected from a sample which is sputtered in a glow discharge environment.

When it is assumed that the maximum emission intensity of the Zn atoms in a measurement range is X and the minimum emission intensity of the Zn atoms in the measurement range is Y, the depth position expressed by the emission intensity (Z) of the Zn atoms in the following Expression (1) is determined as an interface 6 between the surface treatment layer 3 and the chemical conversion layer 4.

$$Z = (X - Y) \times 0.25 + Y \qquad (1)$$

<Interface Between Oxide Layer of Surface Treatment Layer 3 and Metal Layer of Surface Treatment Layer 3>

The interface between the oxide layer of the surface treatment layer 3 and the metal layer of the surface treatment layer 3 is determined on the basis of the measurement result of the emission intensity of oxygen atoms using GDS. A method of determining the interface between the oxide layer of the surface treatment layer 3 and the metal layer of the surface treatment layer 3 varies depending on whether the maximum emission intensity of the oxygen atoms in the chemical conversion layer 4 or the maximum emission intensity of the oxygen atoms in the surface treatment layer 3 is higher.

<Method of Determining Interface Between Oxide Layer of Surface Treatment Layer 3 and Metal Layer of Surface Treatment Layer 3 in Case where Maximum Emission Intensity of Oxygen Atoms in Surface Treatment Layer 3 is Higher than Maximum Emission Intensity of Oxygen Atoms in Chemical Conversion Layer 4>

Figure 3:
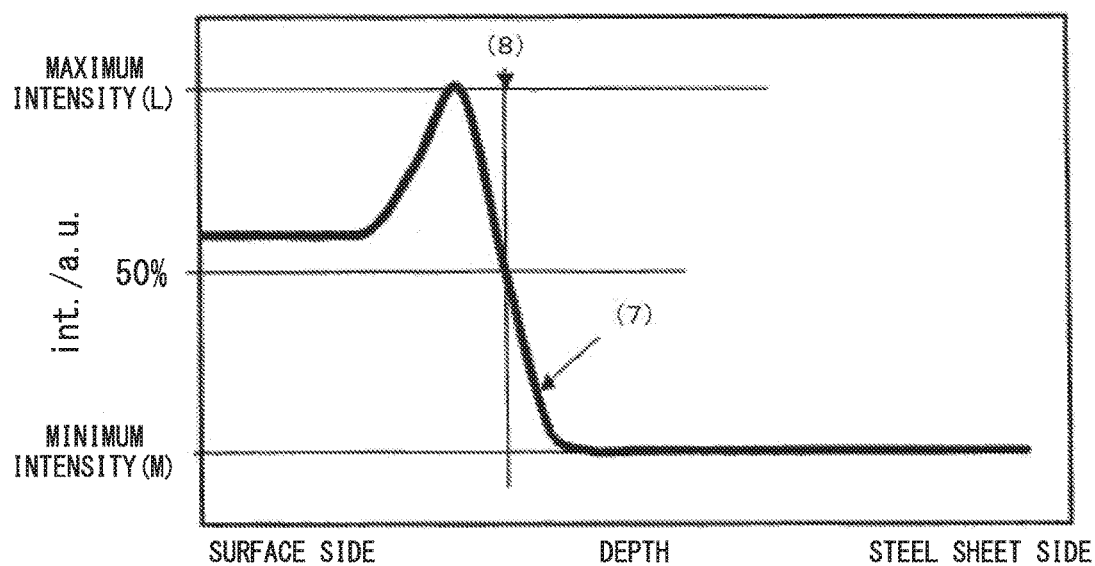
FIG. 3 is a schematic view showing a measurement result of the emission intensity of oxygen atoms when the surface-treated steel sheet of the present invention is analyzed from the surface thereof through GDS.

FIG. 3 shows a measurement result 7 of the emission intensity of the oxygen atoms through GDS in a case where the maximum emission intensity of the oxygen atoms in the surface treatment layer 3 is higher than the maximum emission intensity of the oxygen atoms in the chemical conversion layer 4.

When it is assumed that the maximum emission intensity in the measurement range is L and the minimum emission intensity in the measurement range is M, the depth position expressed by the emission intensity (N) of the oxygen atoms in the following Expression (2) is determined as the interface 6 between the oxide layer of the surface treatment layer 3 and the metal layer of the surface treatment layer 3.

$$N=(L-M)\times 0.5+M \quad (2)$$

<Method of Determining Interface Between Oxide Layer of Surface Treatment Layer 3 and Metal Layer of Surface Treatment Layer 3 in Case where Maximum Emission Intensity of Oxygen Atoms in Chemical Conversion Layer 4 is Higher than Maximum Emission Intensity of Oxygen Atoms in Surface Treatment Layer 3>

Figure 4:
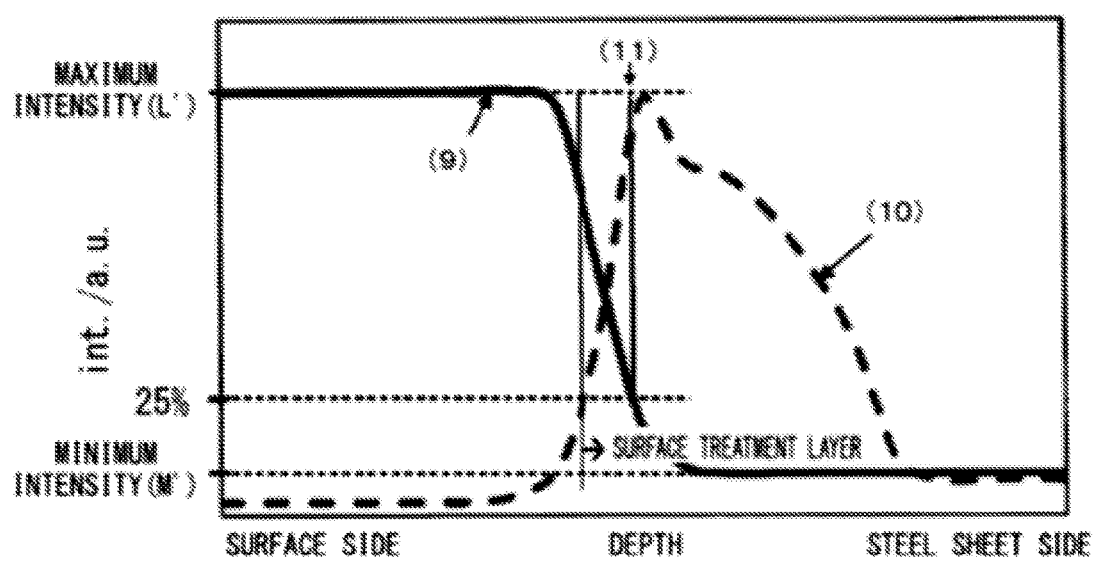
FIG. 4 is a schematic view showing measurement results of the emission intensities of the oxygen atoms and the Zn atoms when the surface-treated steel sheet of the present invention is analyzed from the surface thereof through GDS.

FIG. 4 shows a measurement result 9 of the emission intensity of the oxygen atoms and a measurement result 10 of the emission intensity of the Zn atoms through GDS in a case where the maximum emission intensity of the oxygen atoms in the chemical conversion layer 4 is higher than maximum emission intensity of the oxygen atoms in the oxide layer of the surface treatment layer 3.

When it is assumed that the maximum emission intensity in the measurement range is L' and the minimum emission intensity in the measurement range is M', the depth position expressed by the emission intensity (N') of the oxygen atoms in the following Expression (3) is determined as an interface 11 between the oxide layer of the surface treatment layer and the metal layer of the surface treatment layer.

$$N'=(L'-M')\times 0.25+M' \quad (3)$$

<Diffused State of Fe and Ni in the Vicinity of Surface of Surface Treatment Layer 3>

The diffused state of Fe and Ni in the vicinity of the surface of the surface treatment layer 3 is determined on the basis of the measurement result of the emission intensity of Fe atoms and Ni atoms using GDS.

In a case where alloying is appropriately performed, the emission intensity of the Fe atoms at the interface between the oxide layer of the surface treatment layer 3 and the metal layer of the surface treatment layer 3 is 20% or less of the maximum emission intensity of the Fe atoms in the measurement range.

The same is applied to Ni as in Fe, and in a case where alloying is appropriately performed, the emission intensity of the Ni atoms at the interface between the oxide layer of the surface treatment layer 3 and the metal layer of the surface treatment layer 3 is 20% or less of the maximum emission intensity of the Ni atoms in the measurement range.

<Progress of Alloying of Zn and Ni>

A method of determining the progress of the alloying of Zn and Ni on the basis of the measurement results of the emission intensities of the Zn atoms and the Ni atoms using GDS will be described with reference to FIGS. 5 and 6.

Figure 5:
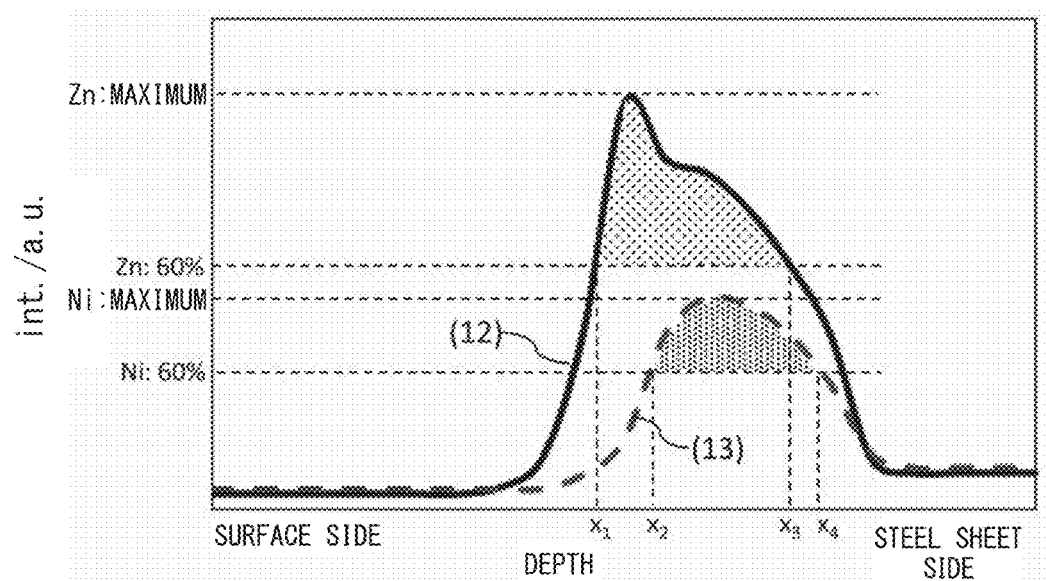
FIG. 5 is a schematic view showing measurement results of the emission intensities of the Zn atoms and Ni atoms when the surface-treated steel sheet of the present invention is analyzed from the surface thereof through GDS in a case where alloying of Zn and Ni is sufficiently performed.

FIG. 5 is a schematic view showing a measurement result 12 of the emission intensity of the Zn atoms and a measurement result 13 of the emission intensity of the Ni atoms when the surface-treated steel sheet of the present invention is analyzed from the surface through GDS in a case where alloying of Zn and Ni is sufficiently performed. FIG. 6 is a schematic view showing a measurement result 14 of the emission intensity of the Zn atoms and a measurement result 15 of the emission intensity of the Ni atoms when the surface-treated steel sheet of the present invention is analyzed from the surface through GDS in a case where alloying of Zn and Ni is insufficiently performed.

Whether or not alloying of Zn and Ni sufficiently proceeds can be checked by whether or not the emission intensity of the Zn atoms and the emission intensity of the Ni atoms overlap each other in a section of 60% or higher of the maximum value. As shown in FIG. 5, the fact that the emission intensity of the Zn atoms and the emission intensity of the Ni atoms overlap each other in the section of 60% or higher of the maximum value means that a Zn—Ni alloy layer is formed through thermal diffusion.

In FIG. 5, in a range of depth positions between $x_1$ and $x_3$, the measurement result 12 of the emission intensity of the Zn atoms is 60% or higher of the maximum value. In a range of depth positions between $x_2$ and $x_4$, the measurement result 13 of the emission intensity of the Ni atoms is 60% or higher of the maximum value. That is, in the case of FIG. 5, in a range of depth positions between $x_2$ and $x_3$, the measurement results of the emission intensities of the Zn atoms and the Ni atoms are respectively 60% or higher of the maximum values thereof.

Figure 6:
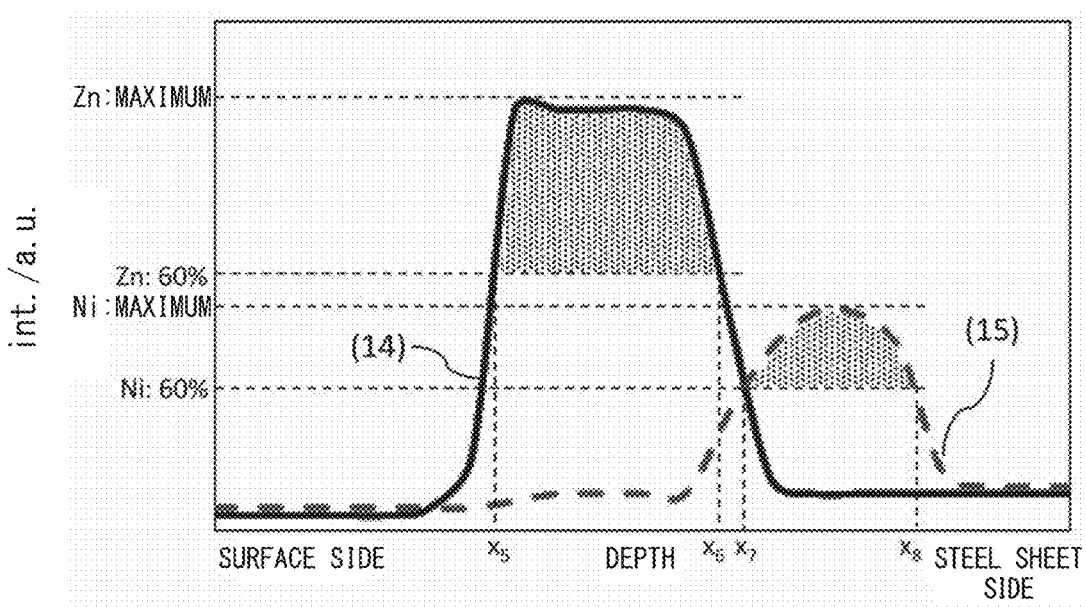
FIG. 6 is a schematic view showing measurement results of the emission intensities of the Zn atoms and the Ni atoms when the surface-treated steel sheet of the present invention is analyzed from the surface thereof in a case where alloying of Zn and Ni is insufficiently performed.

On the other hand, in a case where Zn and Ni are not alloyed with each other, as shown in FIG. 6, the positions of about 50% of the maximum values are coincident with each other.

In FIG. 6, in a range of depth positions between $x_5$ and $x_6$, the measurement result 14 of the emission intensity of the Zn atoms is 60% or higher of the maximum value. In a range of depth positions between $x_7$ and $x_8$, the measurement result 15 of the emission intensity of the Ni atoms is 60% or higher of the maximum value. That is, in the case of FIG. 6, the depth position at which the measurement result 14 of the emission intensity of the Zn atoms is 60% or higher of the maximum value and the depth position at which the measurement result 15 of the emission intensity of the Ni atoms is 60% or higher of the maximum value do not overlap each other.

<Alloyed State of Sn and Other Metals>

The alloyed state of Sn and other metals is determined on the basis of the measurement result of the emission intensity of Sn atoms using GDS. In the measurement result of the emission intensity of the Sn atoms, when one or more of Zn, Ni, and Fe is detected along with Sn, it can be determined that Sn is present in a state of being alloyed with the metals detected along with Sn.

In the surface treatment layer 3 of this embodiment, as described above, Zn and Ni are alloyed with each other. As Zn and Ni are alloyed with each other, various intermetallic compounds containing Zn and Ni are generated. Among the intermetallic compounds, the surface treatment layer 3 of this embodiment contains $Ni_2Zn_{11}$.

In a case where X-ray diffraction analysis is performed on the surface treatment layer 3 of this embodiment, whether or not $Ni_2Zn_{11}$ is present in the surface treatment layer 3 can be identified by data which represents the correspondence relationship between a diffracted X-ray intensity and a diffraction angle 2θ, which can be obtained by irradiating a sample with X-rays. The peak of the diffracted X-ray intensity caused by $Ni_2Zn_{11}$ is detected in a range of diffraction angles 2θ between 34.5° and 35.2°, a range between 39.6° and 40.3°, a range between 49.7° and 50.1°, a range between 78.0° and 78.6°, and a range between 78.7° and 79.2°.

In a case where X-ray diffraction analysis is performed on the surface treatment layer 3 of this embodiment, it is preferable that, among the peaks of the diffracted X-ray intensity caused by $Ni_2Zn_{11}$ mentioned above, the peak of the diffracted X-ray intensity is present in at least one of a range of diffraction angles 2θ between 39.6° and 40.3° and a range between 78.7° and 79.2°. In a case where X-ray diffraction analysis is performed on the surface treatment layer 3, since the peak of the diffracted X-ray intensity is present in at least one of a range of diffraction angles 2θ between 39.6° and 40.3° and a range between 78.7° and 79.2°, the surface-treated steel sheet 1 of this embodiment has more excellent corrosion resistance.

In addition, regarding a test material which is hot-dip coated in a plating bath in which Ni and Zn are in a simultaneously molten state, a test material which is pre-coated with Ni and is thereafter subjected to hot-dip galvanization, and a test material which is electro-coated with Ni and Zn, even though the adhered amount of the Zn coating and the adhered amount of the Ni coating are in the ranges of this embodiment, the peaks of diffracted X-ray intensities are not obtained in a range of diffraction angles 2θ between 39.6° and 40.3° and in a range of diffraction angles 2θ between 78.7° and 79.2°. In addition, such test materials had deteriorated corrosion resistance compared to the surface-treated steel sheet 1 of this embodiment.

It is preferable that the average thickness of the surface treatment layer 3 is 0.30 μm or smaller. Since the average thickness of the surface treatment layer is 0.30 μm or smaller, stress is not accumulated during processing and cracking is less likely to occur.

A manufacturing method of the surface-treated steel sheet 1 of this embodiment will be described.

The surface-treated steel sheet used as the base steel sheet 2 is not particularly limited, and a general cold-rolled steel sheet or hot-rolled steel sheet may be used. However, the surface treatment layer 3 of the surface-treated steel sheet 1 of this embodiment has an extremely low coating adhered amount per unit area. Therefore, in order to uniformly coat the base steel sheet 2 with the surface treatment layer 3, a base steel sheet 2 having a low roughness is preferably used. When the roughness Ra of the base steel sheet 2 is lower than 0.4 μm, particularly stable corrosion resistance is obtained.

Since the surface treatment layer 3 of this embodiment has an extremely low coating adhered amount per unit area, the surface roughness before and after the formation of the surface treatment layer 3 is not substantially changed.

As a method of coating the base steel sheet 2 with Ni, an electro coating method is used. A plating bath for applying Ni (Ni plating bath) is not particularly limited, and well-known plating baths may be used. For example, a Watts bath, a borofluoride bath, a sulfamic acid bath, a nickel sulfate bath, or a nickel chloride bath may be used.

The bath temperature of the Ni plating bath is preferably 55° C. to 65° C.

A gloss additive or the like may be added to the Ni plating bath. The gloss additive is not particularly limited, and a commercially available secondary gloss additive (smoothing agent) such as 1-4 butynediol, formaldehyde, coumarin, or propargyl alcohol may be used.

In a case where a primary gloss additive (refining agent) represented by saccharin or sulfonic acid is used in the Ni plating bath, there is a possibility that a eutectic of S may be formed in the Ni coating and thus the corrosion resistance may be degraded. In addition, in a case where the primary gloss additive is used in the Ni plating bath, there is a possibility that when an Fe—Ni diffused alloy layer is formed, embrittlement of the Ni coating may occur. Therefore, in the case where the primary gloss additive is added to the Ni plating bath, the type and concentration of the primary gloss additive that is added need to be appropriately selected.

As a method of applying Sn, an electro coating method is used. A plating bath for applying Sn (Sn plating bath) is not particularly limited, and well-known plating baths may be used. For example, a Ferrostan bath, a halogen bath, a fluoroborate bath, and a sulfuric acid bath may be used.

The bath temperature of the Sn plating bath is preferably 55° C. to 65° C.

A gloss additive or the like may be added to the Sn plating bath of this embodiment. The gloss additive is not particularly limited, and a commercially available gloss additive such as phenolsulfonic acid, cresol sulfonic acid, 11-naphthol, dihydroxydiphenyl sulfone, ethoxylated naphthol, methoxybenzaldehyde, polyalkylene oxide, gelatin, or polyalkylene glycol may be used.

As a method of applying Zn, an electro coating method is used. A bath for applying Zn (Zn plating bath) is not particularly limited, and well-known plating baths may be used. For example, a sulfuric acid bath, a chloride bath, an acid ammonia bath, a zincate bath, or a cyanide bath may be used.

It is preferable that the Zn plating bath of this embodiment contains an organic additive. The orientation of $Ni_2Zn_{11}$ is appropriately changed by including the organic additive. As the organic additive added to the Zn plating bath, phenolsulfonic acid, ethoxylated naphthol, polyethylene glycol, gelatin, a sulfonic acid compound, succinic acid, polyoxyethylene naphthyl ether, benzaldehyde, citric acid, a salt of citric acid, or an aromatic aldehyde may be employed. Among these materials, as the organic additive added to the Zn plating bath, phenolsulfonic acid and ethoxylated naphthol are particularly preferable.

The Zn plating bath of this embodiment may contain a small amount of metal elements in order to enable the surface-treated steel sheet 1 to have better appearance. As the metal elements, Cr, Co, Ni, Sn, Pb, Cu, Ag, and the like may be employed. The types and amounts of the metal elements that are added need to be selected so as not to allow the ionization tendency of the surface treatment layer 3 to be lower than that of the steel sheet when the metal elements that are added are alloyed with Ni, Zn, or Sn contained in the surface treatment layer 3 through heating.

Particularly, among the metal elements, as the Zn plating bath contains a small amount of Sn, a eutectic of Sn is formed in the surface treatment layer 3. Accordingly, the corrosion resistance of the surface treatment layer 3 is enhanced, and the coatability of the base steel sheet 2 is enhanced by the surface treatment layer 3, which is particularly preferable.

The bath temperature of the Zn plating bath of this embodiment is preferably 55° C. to 65° C. This is because the orientation of $Ni_2Zn_{11}$ is appropriately changed by limiting the bath temperature of the Zn plating bath to 55° C. to 65° C.

In a case where the bath temperature of the Zn plating bath is lower than 55° C. or higher than 65° C., a change in the orientation of $Ni_2Zn_{11}$ does not occur, which is not preferable.

In this embodiment, instead of the Zn plating bath, a Zn—Sn alloy plating bath may also be used.

It is preferable that the Zn—Sn alloy plating bath also contains an organic additive as in the Zn plating bath. The organic additive added to the Zn—Sn alloy plating bath may be the same as in the case of the Zn plating bath.

The bath temperature of the Zn—Sn alloy plating bath is preferably 55° C. to 65° C.

In the manufacturing method of the surface-treated steel sheet 1 of this embodiment, an alloying process is performed after Zn coating or Zn—Sn alloy coating is performed. The heating temperature of the alloying process is 320° C. to 400° C.

By performing the alloying process in this temperature range, the surface-treated steel sheet 1 manufactured in the manufacturing method of the surface-treated steel sheet 1 of this embodiment has excellent corrosion resistance. The reason is not clear but it is thought that the orientation of $Ni_2Zn_{11}$ is appropriately changed by performing the alloying process in this temperature range, and excellent corrosion resistance is provided.

In a case where the alloying process is performed at a temperature of lower than 320° C., a change in the orientation of $Ni_2Zn_{11}$ does not occur. In a case where the alloying process is performed at a temperature of higher than 400° C., a change in the orientation of $Ni_2Zn_{11}$ occurs. However, Zn and Ni are excessively diffused.

For the above reasons, the heating temperature associated with the alloying process is in a range of 320° C. to 400° C.

The heating temperature means the highest reachable temperature by the surface-treated steel sheet 1 during the alloying process.

It is preferable that during the alloying process in the manufacturing method of the surface-treated steel sheet 1 of this embodiment, a temperature of 320° C. or higher is held for 0.2 seconds to 2 seconds. This is because the orientation of $Ni_2Zn_{11}$ is appropriately changed by holding the temperature of 320° C. or higher for 0.2 seconds to 2 seconds.

In a case where the time for holding the temperature of 320° C. or higher is shorter than 0.2 seconds, a change in the orientation of $Ni_2Zn_{11}$ does not occur, which is not preferable. In a case where the time for holding the temperature of 320° C. or higher is longer than 2 seconds, Fe is excessively diffused and the corrosion resistance is degraded, which is not preferable.

In the manufacturing method of the surface-treated steel sheet 1 of this embodiment, it is preferable that after performing the alloying process, a cooling process is performed by immersing the surface-treated steel sheet 1 in water. In a case where the cooling process is not performed, variations in the cooling rate of the portion of the surface-treated steel sheet 1 easily occur. During the cooling process in the manufacturing method of the surface-treated steel sheet 1 of this embodiment, the surface-treated steel sheet 1 is immersed in water in a state at a temperature of 320° C. or higher so as to be cooled.

According to the cooling process of this embodiment, compared to a method of cooling the surface-treated steel sheet 1 in the air or a method of cooling the surface-treated steel sheet 1 by spraying mist thereon, the temperature of the surface-treated steel sheet 1 can be reduced to a temperature of 100° C. or lower more quickly. In a case where the temperature of the surface-treated steel sheet 1 is 100° C. or lower, grain nucleation and grain growth in the surface treatment layer 3 do not proceed. Therefore, according to the cooling process of this embodiment, the orientation of crystals in the surface treatment layer 3 can be easily aligned with a predetermined direction.

During the cooling process of this embodiment, the temperature of the water in which the surface-treated steel sheet 1 is immersed is preferably 45° C. to 95° C. By limiting the temperature of the water in which the surface-treated steel sheet 1 is immersed to the above range, the orientation of $Ni_2Zn_{11}$ becomes an appropriate orientation for exhibiting corrosion resistance.

A time until the cooling process is performed after the alloying process is performed is 0 second to 3 seconds. When the time until the cooling process is performed after the alloying process is performed is longer than 3 seconds, the orientation of $Ni_2Zn_{11}$ is not appropriately changed, which is not preferable.

In addition, the knowledge that the orientation of $Ni_2Zn_{11}$ is changed by performing the cooling process after the alloying process is performed is first obtained by the present invention.

EXAMPLES

Next, the present invention will be non-restrictively described using Examples.

<Original Sheet>

Cold-rolled and annealed steel sheets (an original sheet 1 and an original sheet 2) made of ultra low carbon steel having components shown in Table 1 were used as a base steel sheet. The sheet thickness of the cold-rolled and annealed steel sheets is 0.5 mm.

TABLE 1

| Original sheet | Components (mass %) | | | | | | | | |
|---|---|---|---|---|---|---|---|---|---|
| | C | Si | Mn | P | S | Soluble Al | Nb | Ti | N |
| Original sheet 1 | 0.002 | 0.008 | 0.13 | 0.013 | 0.008 | 0.023 | 0.013 | 0.016 | 0.0018 |
| Original sheet 2 | 0.023 | 0.021 | 0.12 | 0.011 | 0.007 | 0.038 | — | — | 0.003 |

<Formation of Surface Treatment Layer>

A surface treatment layer was formed on the surface of the base steel sheet using plating baths shown in Table 2. After forming the surface treatment layer, the resultant was heated for 10 seconds which was the time until a heating temperature was reached by electric heating. Immediately after the heating, the resultant was immersed in water for 3 seconds or shorter so as to be cooled. The water temperature was in a range of 45° C. to 95° C. In a case where the water temperature was lower than 45° C., the orientation of $Ni_2Zn_{11}$ was not appropriately changed.

TABLE 2

|  | Ni plating bath | Zn plating bath | | | | Zn—Ni alloy plating bath | | | Sn plating bath | Zn—Sn alloy plating bath |
| --- | --- | --- | --- | --- | --- | --- | --- | --- | --- | --- |
|  | (1) | (1) | (2) | (3) | (4) | (1) | (2) | (3) | (1) | (1) |
| Nickel sulfate hexahydrate (g/L) | 263 | — | — | — | — | 263 | 263 | 263 | — | — |
| Zinc sulfate (g/L) | — | 136 | 136 | 136 | 136 | 68 | 68 | 68 | — | 136 |
| Boric acid (g/L) | 40 | — | — | — | — | — | — | — | — | — |
| Sodium sulfate (g/L) | — | 70 | 70 | 70 | 70 | 70 | 70 | 70 | — | 70 |
| Tin sulfate (g/L) | — | — | — | — | — | — | — | — | 30 | 30 |
| Phenolsulfonic acid (g/L) | — | 30 | 30 | — | 30 | 30 | — | 30 | 30 | 30 |
| Ethoxylated α-naphthol (g/L) | — | — | 1 | — | — | — | 1 | — | — | — |
| Bath temperature (° C.) | 55 | 55 | 55 | 55 | 45 | 55 | 55 | 55 | 55 | 55 |

<Formation of Chemical Conversion Layer>

A treating agent 1 and a treating agent 2 were used to form a chemical conversion layer. The composition of the treating Agent 1 is shown in Table 3. In addition, the treating agent 1 is a chemical described in Japanese Patent (Granted) Publication No. 4776458 as Example 22.

The treating agent 2 is a chemical made by mixing a water-based urethane resin TAKELAC (registered trademark) W5100 (manufactured by Mitsui Chemicals, Inc.) having the same mass as that of the solid content of the treating agent 1 with the treating agent 1 and further mixing nickel antimony titanium yellow as a pigment with the resultant to achieve a total solid content of 2%.

The treating agent 1 and the treating material 2 were adhered onto the surface treatment layer to achieve adhered amounts shown in Tables 4 to 6. Heating was performed at a heating temperature of 150° C. for 10 seconds which was the time until 150° C. was reached. Thereafter, the resultant was left in the air such that the chemical conversion layer was formed.

TABLE 3

| Organic silicon compound (W) | (A): 3-aminopropyltriethoxysilane | |
| --- | --- | --- |
|  | (B): 3-glycidoxypropyltrimethoxysilane | |
|  | Ratio (A)/(B) | 1 |
|  | Number of functional groups | 2 |
|  | Molecular weight | 3000 |
| Fluoro compound (X) | Titanium hydrofluoric acid | |
|  | Ratio (X)/(W) | 0.05 |
| Phosphoric acid (Y) | Ratio (Y)/(W) | 0.07 |
| Vanadium compound (Z) | Vanadium oxysulfate | |
|  | Ratio (Z)/(W) | 0.07 |
|  | (Z)/(X) | 1.4 |

<Measurement of Adhered Amount of Coating>

The surface treatment layer was dissolved in hydrochloric acid, and Ni, Zn, and Sn contained in the solution were quantified by inductively coupled plasma mass spectrometer (ICP) to calculate the adhered amounts of the Ni coating, the Zn coating, and the Sn coating per unit area, thereby measuring the adhered amounts of the Ni coating, the Zn coating, and the Sn coating.

<Measurement of Average Thickness of Surface Treatment Layer>

The adhered amounts of the Ni coating, the Zn coating, and the Sn coating quantified by the ICP were divided by the densities of the corresponding metals, and the resultants were added, thereby calculating the average thickness of the surface treatment layer.

<Glow Discharge Spectrometry (GDS)>

The structure of the surface-treated steel sheet was measured by using GDA750 (manufactured by Rigaku Corporation) as a GDS apparatus. During GDS, the surface of the chemical conversion layer was used as a measurement start position, and a position at a depth of 1 μm from the surface of the surface treatment layer toward the surface-treated steel sheet was used as a measurement end position.

<Determination of Interface Between Oxide Layer of Surface Treatment Layer and Metal Layer of Surface Treatment Layer>

The interface between an oxide layer of the surface treatment layer and a metal layer of the surface treatment layer was determined from the measurement result of oxygen atoms obtained using GDS.

<Diffused State of Fe in the Vicinity of Surface of Surface Treatment Layer>

The diffused state of Fe in the vicinity of the surface of the surface treatment layer was determined on the basis of the measurement result of Fe atoms at the interface between the oxide layer of the surface treatment layer and the metal layer of the surface treatment layer using GDS.

In a case where the emission intensity of the Fe atoms at the interface was 20% or less of the maximum emission intensity of the Fe atoms in a measurement range, the diffused state of the Fe atoms in the vicinity of the surface of the surface treatment layer was determined to be within a reference range. On the other hand, in a case where the emission intensity of the Fe atoms at the interface was higher than 20% of the maximum emission intensity of the Fe atoms in the measurement range, the diffused state of Fe in the vicinity of the surface of the surface treatment layer was determined to be outside the reference range.

<Diffused State of Ni in the Vicinity of Surface of Surface Treatment Layer>

The diffused state of Ni in the vicinity of the surface of the surface treatment layer was determined on the basis of the emission intensity of Ni atoms at the interface between the oxide layer of the surface treatment layer and the metal layer of the surface treatment layer using GDS.

In a case where the emission intensity of the Ni atoms at the interface was 20% or less of the maximum emission intensity of the Ni atoms in a measurement range, the diffused state of the Ni atoms in the vicinity of the surface of the surface treatment layer was determined to be within a reference range. On the other hand, in a case where the emission intensity of the Ni atoms at the interface was higher than 20% of the maximum emission intensity of the Ni atoms in the measurement range, the diffused state of Ni in the vicinity of the surface of the surface treatment layer was determined to be outside the reference range.

<Alloyed State of Zn and Ni>

The alloyed state of Zn and Ni was determined on the basis of the measurement results of the Zn atoms and the Ni atoms using GDS. From the measurement results, a depth range (first range) in which the emission intensity of the Zn atoms was 60% or higher of the maximum emission intensity of the Zn atoms, and a depth range (second range) in which the emission intensity of the Ni atoms was 60% or higher of the maximum emission intensity of the Ni atoms were obtained.

In a case where the first range and the second range overlap, the alloyed state of Zn and Ni was determined to be in a reference range. On the other hand, in a case where the first range and the second range did not overlap, the alloyed state of Zn and Ni was determined to be outside the reference range.

<X-Ray Diffraction Analysis>

In order to inspect the presence of $Ni_2Zn_{11}$ in the surface-treated steel sheet, a diffraction line between 39.6° and 40.3° and a diffraction line between 78.7° and 79.2° were inspected through X-ray diffraction analysis.

Specifically, X-ray diffraction analysis was performed using a tube with a Cu anode, and an Xe proportional detector as a detector in a parallel beam method. The measurement conditions that were used include a voltage of 45 kV, a current of 40 mA, measurement angles between 10° and 90°, a slit of ½°, a step size of 0.1°, and an incident angle of 2°.

X-ray diffraction analysis was performed under the above-described measurement conditions, and the presence or absence of peaks in a range of diffraction angles 2θ between 39.6° and 40.3° and a range of diffraction angles 2θ between 78.7° and 79.2° was detected.

Regarding the detection of the peaks, first, in each of the ranges (the range of diffraction angles 2θ between 39.6° and 40.3° and the range of diffraction angles 2θ between 78.7° and 79.2°), a straight line (baseline) was drawn from −0.5° as the lower limit of the diffraction angle 2θ to +0.5° as the upper limit of the diffraction angle 2θ. Next, in the measurement range (the range of diffraction angles 2θ between 10° and) 90°, the maximum X-ray diffraction intensity was obtained.

In a case where a peak having an intensity of 1% or higher of the maximum X-ray diffraction intensity in the measurement range was present in each of the ranges (the range of diffraction angles 2θ between 39.6° and 40.3° and the range of diffraction angles 2θ between 78.7° and 79.2°), it was determined that the peak was present in the range.

For example, in order to inspect the presence of a peak in the diffraction line between 39.6° and 40.3°, first, a baseline that connects two points including 39.1° and 40.8° was drawn. Next, the maximum X-ray diffraction intensity in the measurement range (the range of diffraction angles 2θ between 10° and 90°) was obtained. In addition, in a case where a peak having an intensity of 1% or higher of the maximum X-ray diffraction intensity in the measurement range was present in the range of diffraction angles 2θ between 39.6° and 40.3°, it was determined that the peak was present in the range.

<Evaluation of Corrosion Resistance>

Corrosion resistance was evaluated by a method defined in JIS Z 2371. In this method, corrosion resistance was evaluated by the time until white rust or red rust was generated after spraying a salt water.

For the evaluation of corrosion resistance, an unprocessed flat plate with sealed end surfaces was used as a test piece.

A total of five test pieces subjected to the same process were prepared, and the generation of white rust or red rust was checked every three hours after spraying the salt water. In a case where white rust or red rust was generated on at least one among the five test pieces, the taken time was determined as a rust generation time.

Since the prevention of the generation of white rust is one of the objects of the present invention, the evaluation of corrosion resistance may be performed on the basis of the time until white rust was generated. However, in the surface-treated steel sheet of the present invention, since the adhered amount of the Zn coating is extremely low, there may be cases where the time until red rust is generated after white rust is generated is short. In such a case, there may be cases where the generation of red rust is checked in a state where the generation of white rust is not checked. Therefore, the evaluation of corrosion resistance was performed on the basis of the time until the generation of white rust or red rust.

The evaluation of corrosion resistance was performed by comparing the time until white rust or red rust was generated in each of the test pieces to the time until white rust or red rust was generated in a case where the adhered amount of the Zn coating was 20 g/m² (reference material).

That is, in cases of Examples and Comparative Examples shown in Table 4, corrosion resistance was evaluated by comparing the time until the generation of white rust or red rust to a reference material 1. In cases of Examples and Comparative Examples shown in Table 5, corrosion resistance was evaluated by comparing the time until the generation of white rust or red rust to a reference material 2. In cases of Examples and Comparative Examples shown in Table 6, corrosion resistance was evaluated by comparing the time until the generation of white rust or red rust to a reference material 3.

The time until the generation of white rust or red rust in the reference material was referred to as $T_1$, and the time until the generation of white rust or red rust in each of Examples and Comparative Examples was referred to as $T_2$. In a case where the time difference ($T_1-T_2$) was within 6 hours, it was determined that the same degree of corrosion resistance was provided as in the case where the adhered amount of the Zn coating was 20 mg/m², and the corresponding Examples and Comparative Examples were evaluated as Excellent.

In a case where the time difference ($T_1-T_2$) was within 12 hours, it was determined that although the corrosion resistance was poorer than in the case where the adhered amount of the Zn coating was 20 mg/m², corrosion resistance that did not cause problems in practice was provided, and the corresponding Examples and Comparative Examples were evaluated as Good.

In a case where the time difference ($T_1-T_2$) was longer than 12 hours, it was determined that the corrosion resistance was poorer than in the case where the adhered amount of the Zn coating was 20 mg/m$^2$, and the corresponding Examples and Comparative Examples were evaluated as Poor.

The manufacturing method of each of surface-treated steel sheets and test results thereof are shown in Tables 4 to 9.

TABLE 4

| Level | Original sheet | Original sheet roughness Ra (μm) | Molten Ni bath | Molten Zn bath | Molten Zn—Ni alloy bath | Adhered amount of Ni (g/m$^2$) | Adhered amount of Zn (g/m$^2$) | Heating temperature (° C.) | Holding time at 320° C. or higher (sec) | Average thickness of surface treatment layer (μm) | Cooling process | Chemical conversion Treating agent | Chemical conversion Adhered amount (g/m$^2$) |
|---|---|---|---|---|---|---|---|---|---|---|---|---|---|
| Reference material 1 | Original sheet 1 | 0.25 | — | — | — | 0.00 | 20 | — | — | 2.80 | Yes | 1 | 0.5 |
| Comparative Example 1-1 | Original sheet 1 | 0.25 | — | (1) | — | 0.00 | 1.0 | 350 | 1 | 0.14 | Yes | 1 | 0.5 |
| Example 1-1 | Original sheet 1 | 0.25 | (1) | (1) | — | 0.03 | 1.0 | 350 | 1 | 0.14 | Yes | 1 | 0.5 |
| Example 1-2 | Original sheet 1 | 0.25 | (1) | (1) | — | 0.05 | 1.0 | 350 | 1 | 0.15 | Yes | 1 | 0.5 |
| Example 1-3 | Original sheet 1 | 0.25 | (1) | (1) | — | 0.07 | 1.0 | 350 | 1 | 0.15 | Yes | 1 | 0.5 |
| Example 1-4 | Original sheet 1 | 0.25 | (1) | (1) | — | 0.10 | 1.0 | 350 | 1 | 0.15 | Yes | 1 | 0.5 |
| Example 1-5 | Original sheet 1 | 0.25 | (1) | (1) | — | 0.50 | 1.0 | 350 | 1 | 0.20 | Yes | 1 | 0.5 |
| Example 1-6 | Original sheet 1 | 0.25 | (1) | (1) | — | 1.00 | 1.0 | 350 | 1 | 0.25 | Yes | 1 | 0.5 |
| Comparative Example 1-2 | Original sheet 1 | 0.25 | (1) | (1) | — | 2.00 | 1.0 | 350 | 1 | 0.36 | Yes | 1 | 0.5 |
| Example 1-7 | Original sheet 1 | 0.25 | (1) | (1) | — | 2.00 | 2.0 | 350 | 1 | 0.50 | Yes | 1 | 0.5 |
| Comparative Example 1-3 | Original sheet 1 | 0.25 | (1) | (1) | — | 0.10 | 0.1 | 350 | 1 | 0.03 | Yes | 1 | 0.5 |
| Example 1-8 | Original sheet 1 | 0.25 | (1) | (1) | — | 0.10 | 0.3 | 350 | 1 | 0.05 | Yes | 1 | 0.5 |
| Example 1-9 | Original sheet 1 | 0.25 | (1) | (1) | — | 0.10 | 0.5 | 350 | 1 | 0.08 | Yes | 1 | 0.5 |
| Example 1-10 | Original sheet 1 | 0.25 | (1) | (1) | — | 0.10 | 0.8 | 350 | 1 | 0.12 | Yes | 1 | 0.5 |
| Example 1-11 | Original sheet 1 | 0.25 | (1) | (1) | — | 0.10 | 1.2 | 350 | 1 | 0.18 | Yes | 1 | 0.5 |
| Example 1-12 | Original sheet 1 | 0.25 | (1) | (1) | — | 0.10 | 1.5 | 350 | 1 | 0.22 | Yes | 1 | 0.5 |
| Example 1-13 | Original sheet 1 | 0.25 | (1) | (1) | — | 0.10 | 2.0 | 350 | 1 | 0.29 | Yes | 1 | 0.5 |
| Comparative Example 1-4 | Original sheet 1 | 0.25 | (1) | (1) | — | 0.10 | 1.0 | — | — | 0.15 | Yes | 1 | 0.5 |
| Comparative Example 1-5 | Original sheet 1 | 0.25 | (1) | (1) | — | 0.10 | 1.0 | 200 | — | 0.15 | Yes | 1 | 0.5 |
| Comparative Example 1-6 | Original sheet 1 | 0.25 | (1) | (1) | — | 0.10 | 1.0 | 300 | — | 0.15 | Yes | 1 | 0.5 |
| Comparative Example 1-7 | Original sheet 1 | 0.25 | (1) | (1) | — | 0.10 | 1.0 | 315 | — | 0.15 | Yes | 1 | 0.5 |
| Example 1-14 | Original sheet 1 | 0.25 | (1) | (1) | — | 0.10 | 1.0 | 400 | 1.5 | 0.15 | Yes | 1 | 0.5 |
| Comparative Example 1-8 | Original sheet 1 | 0.25 | (1) | (1) | — | 0.10 | 1.0 | 500 | 2.5 | 0.15 | Yes | 1 | 0.5 |
| Comparative Example 1-9 | Original sheet 1 | 0.25 | — | — | (1) | 0.10 | 1.0 | — | — | 0.15 | Yes | 1 | 0.5 |
| Comparative Example 1-10 | Original sheet 1 | 0.25 | — | — | (2) | 0.10 | 1.0 | — | — | 0.15 | Yes | 1 | 0.5 |
| Comparative Example 1-11 | Original sheet 1 | 0.25 | — | — | (3) | 0.10 | 1.0 | — | — | 0.15 | Yes | 1 | 0.5 |
| Example 1-15 | Original sheet 1 | 0.25 | (1) | (2) | — | 0.10 | 1.0 | 350 | 1 | 0.15 | Yes | 1 | 0.5 |
| Example 1-16 | Original sheet 1 | 0.25 | (1) | (3) | — | 0.10 | 1.0 | 350 | 1 | 0.15 | Yes | 1 | 0.5 |
| Example 1-17 | Original sheet 1 | 0.25 | (1) | (4) | — | 0.10 | 1.0 | 350 | 1 | 0.15 | Yes | 1 | 0.5 |
| Example 1-18 | Original sheet 1 | 0.25 | (1) | (1) | — | 0.10 | 1.0 | 350 | 1 | 0.15 | No | 1 | 0.5 |
| Comparative Example 1-12 | Original sheet 1 | 0.25 | (1) | (1) | — | 0.10 | 1.0 | 350 | 0.1 | 0.15 | Yes | 1 | 0.5 |

TABLE 4-continued

| Level | Original sheet | Original sheet roughness Ra (μm) | Molten Ni bath | Molten Zn bath | Molten Zn—Ni alloy bath | Adhered amount of Ni (g/m²) | Adhered amount of Zn (g/m²) | Heating temperature (°C.) | Holding time at 320°C. or higher (sec) | Average thickness of surface treatment layer (μm) | Cooling process | Chemical conversion Treating agent | Chemical conversion Adhered amount (g/m²) |
|---|---|---|---|---|---|---|---|---|---|---|---|---|---|
| Comparative Example 1-13 | Original sheet 1 | 0.25 | (1) | (1) | — | 0.10 | 1.0 | 350 | 50 | 0.15 | Yes | 1 | 0.5 |

TABLE 5

| Level | Original sheet | Original sheet roughness Ra (μm) | Molten Ni bath | Molten Zn bath | Molten Zn—Ni alloy bath | Adhered amount of Ni (g/m²) | Adhered amount of Zn (g/m²) | Heating temperature (°C.) | Holding time at 320°C. or higher (sec) | Average thickness of surface treatment layer (μm) | Cooling process | Chemical conversion Treating agent | Chemical conversion Adhered amount (g/m²) |
|---|---|---|---|---|---|---|---|---|---|---|---|---|---|
| Reference material 2 | Original sheet 1 | 0.25 | — | — | — | 0 | 20 | — | — | 0.15 | Yes | 2 | 1.0 |
| Example 2-1 | Original sheet 1 | 0.25 | (1) | (1) | — | 0.10 | 1.0 | 320 | 1 | 0.15 | Yes | 2 | 1.0 |
| Example 2-2 | Original sheet 1 | 0.25 | (1) | (1) | — | 0.10 | 1.0 | 350 | 1 | 0.15 | Yes | 2 | 1.0 |
| Example 2-3 | Original sheet 1 | 0.25 | (1) | (1) | — | 0.10 | 1.0 | 400 | 1 | 0.15 | Yes | 2 | 1.0 |
| Example 2-4 | Original sheet 1 | 0.25 | (1) | (1) | — | 0.10 | 2.0 | 350 | 1 | 0.15 | Yes | 2 | 1.0 |
| Comparative Example 2-1 | Original sheet 1 | 0.25 | (1) | (1) | — | 0 | 1.0 | 350 | 1 | 0.15 | Yes | 2 | 1.0 |
| Comparative Example 2-2 | Original sheet 1 | 0.25 | (1) | (1) | — | 0.10 | 1.0 | 500 | 1 | 0.15 | Yes | 2 | 1.0 |
| Comparative Example 2-3 | Original sheet 1 | 0.25 | — | — | (1) | 0.10 | 1.0 | — | — | 0.15 | Yes | 2 | 1.0 |

TABLE 6

| Level | Original sheet | Original sheet roughness Ra (μm) | Molten Ni bath | Molten Sn bath | Molten Zn bath | Molten Zn—Sn alloy bath | Adhered amount of Ni (g/m²) | Adhered amount of Sn (g/m²) |
|---|---|---|---|---|---|---|---|---|
| Reference material 3 | Original sheet 2 | 0.24 | — | — | — | — | 0 | 0 |
| Example 3-1 | Original sheet 2 | 0.24 | (1) | — | (1) | — | 0.10 | 0.00 |
| Example 3-2 | Original sheet 2 | 0.24 | (1) | — | (1) | — | 0.10 | 0.00 |
| Example 3-3 | Original sheet 2 | 0.24 | (1) | — | (1) | — | 0.10 | 0.00 |
| Example 3-4 | Original sheet 2 | 0.24 | (1) | — | (1) | — | 0.10 | 0.00 |
| Example 3-5 | Original sheet 2 | 0.24 | (1) | (1) | (1) | — | 0.10 | 0.10 |
| Example 3-6 | Original sheet 2 | 0.24 | (1) | (1) | (1) | — | 0.10 | 0.02 |
| Example 3-7 | Original sheet 2 | 0.24 | (1) | (1) | (1) | — | 0.10 | 0.05 |
| Example 3-8 | Original sheet 2 | 0.24 | (1) | (1) | (1) | — | 0.10 | 0.04 |
| Example 3-9 | Original sheet 2 | 0.24 | (1) | (1) | (1) | — | 0.10 | 0.03 |
| Comparative Example 3-1 | Original sheet 2 | 0.24 | (1) | (1) | (1) | — | 0.10 | 0.50 |
| Example 3-10 | Original sheet 2 | 0.38 | (1) | — | (1) | — | 0.10 | 0.00 |
| Example 3-11 | Original sheet 2 | 1.15 | (1) | — | (1) | — | 0.10 | 0.00 |
| Example 3-12 | Original sheet 2 | 1.15 | (1) | — | (1) | — | 0.03 | 0.00 |

TABLE 6-continued

| | | | | | | | | |
|---|---|---|---|---|---|---|---|---|
| Example 3-13 | Original sheet 2 | 1.15 | (1) | — | (1) | — | 0.04 | 0.00 |
| Example 3-14 | Original sheet 2 | 1.15 | (1) | — | (1) | — | 0.60 | 0.00 |
| Example 3-15 | Original sheet 2 | 0.24 | (1) | — | — | (1) | 0.10 | 0.02 |
| Comparative Example 3-2 | Original sheet 2 | 0.24 | (1) | — | — | (1) | 0.10 | 0.02 |
| Comparative Example 3-3 | Original sheet 2 | 1.15 | (1) | — | (1) | — | 0.02 | 0.00 |

| Level | Adhered amount of Zn (g/m$^2$) | Heating temperature (°C.) | Holding time at 320° C. or higher (sec) | Average thickness of surface treatment layer (μm) | Cooling process | Chemical conversion Treating agent | Adhered amount (g/m$^2$) |
|---|---|---|---|---|---|---|---|
| Reference material 3 | 20 | — | — | 2.80 | Yes | 1 | 0.5 |
| Example 3-1 | 1.0 | 350 | 1 | 0.15 | Yes | 1 | 0.5 |
| Example 3-2 | 0.7 | 350 | 1 | 0.11 | Yes | 1 | 0.5 |
| Example 3-3 | 0.5 | 350 | 1 | 0.08 | Yes | 1 | 0.5 |
| Example 3-4 | 1.2 | 350 | 1 | 0.18 | Yes | 1 | 0.5 |
| Example 3-5 | 1.2 | 350 | 1 | 0.19 | Yes | 1 | 0.5 |
| Example 3-6 | 1.2 | 350 | 1 | 0.18 | Yes | 1 | 0.5 |
| Example 3-7 | 0.5 | 350 | 1 | 0.09 | Yes | 1 | 0.5 |
| Example 3-8 | 0.5 | 350 | 1 | 0.09 | Yes | 1 | 0.5 |
| Example 3-9 | 0.5 | 350 | 1 | 0.09 | Yes | 1 | 0.5 |
| Comparative Example 3-1 | 0.5 | — | — | 0.15 | Yes | 1 | 0.5 |
| Example 3-10 | 1.2 | 350 | 1 | 0.18 | Yes | 1 | 0.5 |
| Example 3-11 | 1.2 | 350 | 1 | 0.18 | Yes | 1 | 0.5 |
| Example 3-12 | 1.2 | 350 | 1 | 0.17 | Yes | 1 | 0.5 |
| Example 3-13 | 1.2 | 350 | 1 | 0.17 | Yes | 1 | 0.5 |
| Example 3-14 | 1.2 | 350 | 1 | 0.24 | Yes | 1 | 0.5 |
| Example 3-15 | 0.5 | 350 | 1 | 0.08 | Yes | 1 | 0.5 |
| Comparative Example 3-2 | 0.5 | 300 | — | 0.08 | Yes | 1 | 0.5 |
| Comparative Example 3-3 | 1.2 | 350 | 1 | 0.17 | Yes | 1 | 0.5 |

TABLE 7

| Level | Structure of surface treatment layer | | | Presence or absence of peak in 39.6° to 40.3° and in 78.7° to 79.2° | Corrosion resistance |
|---|---|---|---|---|---|
| | Diffused state of Fe | Diffused state of Ni | Diffused state of Ni—Zn alloy | | |
| Reference material 1 | — | — | — | Absent | Reference range |
| Comparative Example 1-1 | Within reference | Within reference | Outside reference | Absent | Poor |
| Example 1-1 | Within reference | Within reference | Within reference | Present | Good |
| Example 1-2 | Within reference | Within reference | Within reference | Present | Good |
| Example 1-3 | Within reference | Within reference | Within reference | Present | Excellent |
| Example 1-4 | Within reference | Within reference | Within reference | Present | Excellent |
| Example 1-5 | Within reference | Within reference | Within reference | Present | Good |
| Example 1-6 | Within reference | Within reference | Within reference | Present | Good |
| Comparative Example 1-2 | Within reference | Within reference | Outside reference | Absent | Poor |
| Example 1-7 | Within reference | Within reference | Within reference | Present | Good |
| Comparative Example 1-3 | Outside reference | Outside reference | Within reference | Absent | Poor |
| Example 1-8 | Within reference | Within reference | Within reference | Present | Good |
| Example 1-9 | Within reference | Within reference | Within reference | Present | Good |

TABLE 7-continued

| Level | Structure of surface treatment layer | | | Presence or absence of peak in 39.6° to 40.3° and in 78.7° to 79.2° | Corrosion resistance |
|---|---|---|---|---|---|
| | Diffused state of Fe | Diffused state of Ni | Diffused state of Ni—Zn alloy | | |
| Example 1-10 | Within reference | Within reference | Within reference | Present | Excellent |
| Example 1-11 | Within reference | Within reference | Within reference | Present | Excellent |
| Example 1-12 | Within reference | Within reference | Within reference | Present | Excellent |
| Example 1-13 | Within reference | Within reference | Within reference | Present | Excellent |
| Comparative Example 1-4 | Within reference | Within reference | Outside reference | Absent | Poor |
| Comparative Example 1-5 | Within reference | Within reference | Outside reference | Absent | Poor |
| Comparative Example 1-6 | Within reference | Within reference | Outside reference | Absent | Poor |
| Comparative Example 1-7 | Within reference | Within reference | Outside reference | Absent | Poor |
| Example 1-14 | Within reference | Within reference | Within reference | Present | Good |
| Comparative Example 1-8 | Outside reference | Outside reference | Within reference | Absent | Poor |
| Comparative Example 1-9 | Within reference | Outside reference | Within reference | Absent | Poor |
| Comparative Example 1-10 | Within reference | Within reference | Outside reference | Absent | Poor |
| Comparative Example 1-11 | Within reference | Within reference | Outside reference | Absent | Poor |
| Example 1-15 | Within reference | Within reference | Within reference | Present | Excellent |
| Example 1-16 | Within reference | Within reference | Within reference | Absent | Good |
| Example 1-17 | Within reference | Within reference | Within reference | Absent | Good |
| Example 1-18 | Within reference | Within reference | Within reference | Absent | Good |
| Comparative Example 1-12 | Within reference | Within reference | Outside reference | Absent | Poor |
| Comparative Example 1-13 | Outside reference | Outside reference | Within reference | Absent | Poor |

TABLE 8

| Level | Structure of surface treatment layer | | | Presence or absence of peak in 39.6° to 40.3° and in 78.7° to 79.2° | Corrosion resistance |
|---|---|---|---|---|---|
| | Diffused state of Fe | Diffused state of Ni | Diffused state of Ni—Zn alloy | | |
| Reference material 2 | — | — | — | Absent | Reference range |
| Example 2-1 | Within reference | Within reference | Within reference | Present | Good |
| Example 2-2 | Within reference | Within reference | Within reference | Present | Excellent |
| Example 2-3 | Within reference | Within reference | Within reference | Present | Good |
| Example 2-4 | Within reference | Within reference | Within reference | Present | Excellent |
| Comparative Example 2-1 | Within reference | Within reference | Outside reference | Absent | Poor |
| Comparative Example 2-2 | Outside reference | Outside reference | Within reference | Absent | Poor |
| Comparative Example 2-3 | Within reference | Outside reference | Within reference | Absent | Poor |

TABLE 9

| Level | Structure of surface treatment layer | | | | Presence or absence of peak in 39.6° to 40.3° and in 78.7° to 79.2° | Corrosion resistance |
|---|---|---|---|---|---|---|
| | Diffused state of Fe | Diffused state of Ni | Diffused state of Ni—Zn alloy | Alloyed state of Sn | | |
| Reference material 3 | — | — | — | — | Absent | Reference range |
| Example 3-1 | Within reference | Within reference | Within reference | — | Present | Excellent |
| Example 3-2 | Within reference | Within reference | Within reference | — | Present | Excellent |
| Example 3-3 | Within reference | Within reference | Within reference | — | Present | Good |
| Example 3-4 | Within reference | Within reference | Within reference | — | Present | Excellent |
| Example 3-5 | Within reference | Within reference | Within reference | Alloyed | Present | Excellent |
| Example 3-6 | Within reference | Within reference | Within reference | Alloyed | Present | Excellent |
| Example 3-7 | Within reference | Within reference | Within reference | Alloyed | Present | Good |
| Example 3-8 | Within reference | Within reference | Within reference | Alloyed | Present | Good |
| Example 3-9 | Within reference | Within reference | Within reference | Alloyed | Present | Good |
| Comparative Example 3-1 | Within reference | Within reference | Outside reference | Single element | Absent | Poor |
| Example 3-10 | Within reference | Within reference | Within reference | — | Present | Excellent |
| Example 3-11 | Within reference | Within reference | Within reference | — | Present | Good |
| Example 3-12 | Within reference | Within reference | Within reference | — | Present | Good |
| Example 3-13 | Within reference | Within reference | Within reference | — | Present | Good |
| Example 3-14 | Within reference | Within reference | Within reference | — | Present | Good |
| Example 3-15 | Within reference | Within reference | Within reference | Alloyed | Present | Excellent |
| Comparative Example 3-2 | Within reference | Within reference | Outside reference | Alloyed | Absent | Poor |
| Comparative Example 3-3 | Within reference | Within reference | Outside reference | Alloyed | Absent | Poor |

Rust was generated in the reference material 1 and the reference material 3 after 60 hours after spraying the salt water, and rust was generated in the reference material 2 after 84 hours after spraying the salt water.

In all of Examples 1-1 to 1-18 shown in Table 4, the time until the generation of rust was 48 hours or longer after spraying the salt water. On the other hand, in Comparative Examples 1-1 to 1-13, rust was generated within 45 hours after spraying the salt water. It is thought that this is for the following reasons.

In Comparative Example 1-1, it is thought that since Ni coating was not provided, the coatability of the base steel sheet by the surface treatment layer was low and rust was generated early.

In Comparative Example 1-2, it is thought that since the adhered amount of the Ni coating was high, Ni having a higher ionization tendency than that the base steel sheet had remained in the surface treatment layer and thus rust was generated early.

In Comparative Example 1-3, it is thought that since the adhered amount of the Zn coating was low, the coatability of the base steel sheet by the surface treatment layer was low and rust was generated early.

In Comparative Example 1-4, it is thought that since Ni and Zn were not alloyed with each other, the coatability of the base steel sheet by the surface treatment layer was low and rust was generated early.

In Comparative Example 1-5, it is thought that since alloying of Ni and Zn was insufficiently performed, the coatability of the base steel sheet by the surface treatment layer was low and rust was generated early.

In Comparative Examples 1-6 and 1-7, it is thought that since the heating temperature of the alloying process was insufficient, and the orientation of $Ni_2Zn_{11}$ was inappropriately changed.

In Comparative Example 1-8, it is thought that since Fe and Ni were diffused to the vicinity of the surface of the chemical conversion layer, rust was generated early.

In Comparative Examples 1-9 to 1-11, it is thought that since Ni and Zn were in a state of being precipitated as an alloy, the coatability of the base steel sheet by the surface treatment layer was low and rust was generated early.

In Comparative Example 1-12, it is thought that since the holding time at 320° C. or higher was 0.1 seconds, the orientation of $Ni_2Zn_{11}$ was inappropriately changed, and rust was generated early.

In Comparative Example 1-13, it is thought that since the holding time at 320° C. or higher was 5.0 seconds, Fe and Ni were diffused to the vicinity of the surface of the chemical conversion layer. Accordingly, it is through that the coatability of the base steel sheet by the surface treatment layer was low and rust was generated early.

In all of Examples 2-1 to 2-4 shown in Table 5, the time until the generation of rust was 72 hours or longer after spraying the salt water. On the other hand, in all of Comparative Examples 2-1 to 2-3, rust was generated within 72 hours after spraying the salt water. It is thought that this is for the following reasons.

In Comparative Example 2-1, it is thought that since Ni coating was not provided, the coatability of the base steel sheet by the surface treatment layer was low and rust was generated early.

In Comparative Example 2-2, it is thought that since Fe and Ni were diffused to the vicinity of the surface of the chemical conversion layer, the coatability of the base steel sheet by the surface treatment layer was low, and rust was generated early.

In Comparative Example 2-3, it is thought that since Ni and Zn were in a state of being precipitated as an alloy, the coatability of the base steel sheet by the surface treatment layer was low and rust was generated early.

In all of Examples 3-1 to 3-15 shown in Table 6, the time until the generation of rust was 48 hours or longer after spraying the salt water. On the other hand, in Comparative Examples 3-1 to 3-3, rust was generated within 45 hours after spraying the salt water.

In addition, in Examples 3-5 to 3-9 and Comparative Example 3-1, Sn coating was performed using a Sn plating bath (1) between Ni coating and Zn coating.

In addition, in Example 3-15 and Comparative Example 3-2, after performing Ni coating, Zn—Sn alloy coating was performed using a Zn—Sn alloy plating bath (1) shown in Table 2.

It is thought that the reason that rust was generated within 45 hours in Comparative Examples 3-1 to 3-3 is as follows.

In Comparative Example 3-1, it is thought that since the alloying process was not performed, Sn having a lower ionization tendency than that the base steel sheet had remained in the surface treatment layer and thus rust was exhibited early.

In Comparative Example 3-2, it is thought that since the heating temperature of the alloying process was insufficient, and the orientation of $Ni_2Zn_{11}$ was inappropriately changed, and rust was generated early.

In Comparative Example 3-3, it is thought that since the adhered amount of the Ni coating was low, the corrosion resistance of Ni was insufficiently exhibited, and thus rust was generated early.

In addition, it is thought that the corrosion resistance of Example 3-11 was poorer than the corrosion resistance of Examples 3-1 and 3-10 because the surface roughness of the base steel sheet was high and the coatability of the base steel sheet by the surface treatment layer and the chemical conversion layer was low.

INDUSTRIAL APPLICABILITY

According to the embodiment, a surface-treated steel sheet which is excellent in corrosion resistance, economic efficiency, productivity, and environmental properties can be provided.

BRIEF DESCRIPTION OF THE REFERENCE SYMBOLS

1: SURFACE-TREATED STEEL SHEET
2: BASE STEEL SHEET
3: SURFACE TREATMENT LAYER
4: CHEMICAL CONVERSION LAYER
5: MEASUREMENT RESULT OF EMISSION INTENSITY OF Zn ATOMS
6: INTERFACE BETWEEN SURFACE TREATMENT LAYER AND CHEMICAL CONVERSION LAYER
7: MEASUREMENT RESULT OF EMISSION INTENSITY OF OXYGEN ATOMS
8: INTERFACE BETWEEN OXIDE LAYER AND METAL LAYER IN SURFACE TREATMENT LAYER
9: MEASUREMENT RESULT OF EMISSION INTENSITY OF OXYGEN ATOMS
10: MEASUREMENT RESULT OF EMISSION INTENSITY OF Zn ATOMS
11: INTERFACE BETWEEN OXIDE LAYER AND METAL LAYER IN SURFACE TREATMENT LAYER
12: MEASUREMENT RESULT OF EMISSION INTENSITY OF Zn ATOMS
13: MEASUREMENT RESULT OF EMISSION INTENSITY OF Ni ATOMS
14: MEASUREMENT RESULT OF EMISSION INTENSITY OF Zn ATOMS
15: MEASUREMENT RESULT OF EMISSION INTENSITY OF Ni ATOMS

What is claimed is:

1. A surface-treated steel sheet comprising:
a base steel sheet;
a surface treatment layer which is formed on at least one surface of the base steel sheet and which consists of an oxide layer and a metal layer; and
a chemical conversion layer which is formed on a surface of the surface treatment layer,
wherein the surface treatment layer contains Zn in an adhered amount of 0.30 $g/m^2$ to 2.00 $g/m^2$ and Ni in an adhered amount of 0.03 $g/m^2$ to 2.00 $g/m^2$, wherein the adhered amount of Ni is equal to or lower than the adhered amount of Zn,
the oxide layer is formed on a surface of the metal layer and is between the chemical conversion layer and the metal layer,
wherein distribution curves of emission intensities of Fe atoms, Zn atoms, and Ni atoms are obtained respectively by performing a glow discharge spectrometry in a range from a surface of the chemical conversion layer, which is used as a measurement start position, to a position at 1 μm from the surface of the surface treatment layer in a depth direction, which is used as a measurement end position,
the emission intensity of the Fe atoms at an interface between the oxide layer and the metal layer is 20% or less of a maximum emission intensity of the Fe atoms in the measured range,
the emission intensity of the Ni atoms at the interface is 20% or less of a maximum emission intensity of the Ni atoms, and
a first range in which the emission intensity of the Zn atoms is 60% or higher of a maximum emission intensity of the Zn atoms and a second range in which the emission intensity of the Ni atoms is 60% or higher of the maximum emission intensity of the Ni atoms overlap in the depth direction.

2. The surface-treated steel sheet according to claim 1, wherein measurement data which represents a correspondence relationship between a diffracted X-ray intensity and a diffraction angle 2θ is obtained by performing an X-ray diffraction analysis on the surface treatment layer and a peak of the diffracted X-ray intensity is present in at least one of a range of the diffraction angles 2θ between 39.6° and 40.3° and a range of the diffraction angles 2θ between 78.7° and 79.2°.

3. The surface-treated steel sheet according to claim 1, wherein the adhered amount of Zn in the surface treatment layer is 0.80 g/m² to 1.20 g/m², and the adhered amount of Ni in the surface treatment layer is equal to or higher than 0.07 g/m² and is equal to or lower than half of the adhered amount of Zn.

4. The surface-treated steel sheet according to claim 1, wherein the surface treatment layer further contains Sn in an adhered amount of 10% or lower of the adhered amount of Zn, and wherein Sn is contained as an alloy with other metals in the surface treatment layer.

5. The surface-treated steel sheet according to claim 1, wherein an average thickness of the surface treatment layer is 0.30 μm or smaller.

* * * * *